US006648254B2

(12) United States Patent
Hruska

(10) Patent No.: US 6,648,254 B2
(45) Date of Patent: Nov. 18, 2003

(54) BALE PROCESSOR

(75) Inventor: Kevin Hruska, Gerald (CA)

(73) Assignee: Bridgeview Mfg. Inc., Saskatchewan (CA)

( * ) Notice: Subject to any disclaimer, the term of this patent is extended or adjusted under 35 U.S.C. 154(b) by 132 days.

(21) Appl. No.: 09/885,496

(22) Filed: Jun. 20, 2001

(65) Prior Publication Data

US 2002/0084371 A1 Jul. 4, 2002

Related U.S. Application Data

(60) Provisional application No. 60/259,588, filed on Jan. 4, 2001.

(51) Int. Cl.[7] ............................................... B02C 19/12
(52) U.S. Cl. ............................ 241/101.763; 241/189.1; 241/605
(58) Field of Search ..................... 241/101.742, 101.74, 241/101.762, 101.763, 101.76, 101.77, 189.1, 194, 195, 604, 605, 185.1

(56) References Cited

U.S. PATENT DOCUMENTS

| 4,524,916 A | 6/1985 | Keyes et al. |
|---|---|---|
| 4,657,191 A | 4/1987 | Dwyer et al. |
| 6,109,553 A | 8/2000 | Hruska |
| 6,199,781 B1 | 3/2001 | Hruska |
| 6,202,950 B1 | 3/2001 | Hruska |

FOREIGN PATENT DOCUMENTS

| CA | 2291319 | 5/2001 |
|---|---|---|

*Primary Examiner*—W. Donald Bray
(74) *Attorney, Agent, or Firm*—Dinsmore & Shohl LLP

(57) ABSTRACT

The crop material processor for disintegrating baled crop material comprises a housing for receiving and containing the baled crop material. The housing has a front wall, a back wall, a left side wall, a right side wall and a bottom, wherein each of the left and right side walls includes a fixed lower section and a pivotably mounted upper section forming a movable wing. The processor further includes a disintegrator having a roller positioned along the length of the housing, manipulator rollers mounted inside the housing, and a discharge opening at the bottom of one of the side walls to discharge crop material from the processor. Each of the fixed side walls sections may have a protrusion projecting into the housing substantially level with and parallel to the manipulator roller. Each wing, which rotates about an axis positioned generally at the same level as the manipulator roller, comprises a back panel having one edge fixed to an axle for rotating the wing. The wing may include an arcuate back panel constructed from a number of segments with a side panel fixed to each end of the back panel. In addition, the wings may further include manipulator rollers mounted within them so as to be substantially parallel to the manipulator rollers in the housing. A mechanism including levers fixed and driven by a linear motor is used to lift and lower the wings.

13 Claims, 10 Drawing Sheets

BALE PROCESSOR

This application claims the benefit of U.S. Provisional Patent Application Serial No. 60/259,588 filed on Jan. 4, 2001.

FIELD OF THE INVENTION

The invention relates generally to bale processors and more particularly to a bale processor for all shapes and sizes of bales.

BACKGROUND OF THE INVENTION

Crop materials, such as straw, hay or other forage are often baled in order to protect the material and make it easy to move and store at an appropriate location. When the material is to be used for feed or bedding, the bales must be transported to the location where they are required, broken apart and distributed in some desirable manner.

Bale processors have achieved widespread use for the shredding of either round or square bales for feed or bedding for animals since they represent a quick and efficient manner for operators to shred and distribute crop materials.

Equipment for producing square and round bales in various sizes is presently readily available, though square balers are becoming ever more popular in view of the convenience of manipulating, transporting and stacking the bales.

Over the years, a number of bale processors have been developed which are capable of loading and processing round bales. U.S. Pat. No. 6,202,950 which issued to Hruska on Mar. 20, 2001, U.S. Pat. No. 6,199,781 which issued to Hruska on Mar. 13, 2001 and U.S. Pat. No. 6,109,553 which issued to Hruska on Aug. 29, 2000 describe a variety of such bale processors; these patents are incorporated herein by reference. These bale processors disintegrate bales and discharge the material either as bedding across an area, or as feed in the form of a windrow or into a feed bunk.

These and other similar bale processors are particularly adapted to process round bales and are capable of carrying one or two large bales to the location where the material is required as described in U.S. Pat. No. 6,199,781 noted above. In order to process more then two bales, it is necessary for the bale processor to return to where the bales are stored or to have a second machine with a front end loader bring the bales to the processor.

A further bale processor designed to carry more than one round bale at a time is described in U.S. Pat. No. 4,657,191 which issued to Dwyer et al on Apr. 14, 1987. This particular bale processor includes an elongated conveyor pivotally mounted about its wheel axle such that the back end will pivot towards the ground enabling the conveyor to move a number of bales onto itself.

A bale processor developed for loading and processing square bales is described in U.S. patent application Ser. No. 09/715,822 filed on Nov. 17, 2000 which corresponds with Canadian Patent Application Serial No. 2,291,319 filed on Nov. 30, 1999 and which is incorporated herein by reference. This bale processor disintegrates bales and discharges the material either as bedding across an area, or as feed in the form of a windrow or into a feed bunk.

Even though bale processor may be able to handle different types of bales, most bale processors have been designed to handle bales of one type or another efficiently. this limits their use, since people may not want to limit themselves to bales primarily of one type or another.

Therefore, there is a need for bale processors which can process bales of various shapes and sizes.

SUMMARY OF THE INVENTION

The invention is directed to a crop material processor for disintegrating baled crop material comprising a housing for receiving and containing the baled crop material, the housing having a front wall, a back wall, a left side wall, a right side wall and a bottom, wherein each of the left and right side walls includes a fixed lower section and a pivotably mounted upper section forming a movable wing. The processor further includes a disintegrator having a roller positioned along the length of the housing and mounted to rotate about its own longitudinal axis, manipulator rollers mounted inside the housing substantially parallel to the disintegrator roller, and a discharge opening at the bottom of one of the side walls to discharge material from the processor.

With regard to a detail of the present invention, each of the fixed side walls sections may have a protrusion projecting into the housing substantially level with and parallel to the manipulator roller.

In accordance with another aspect of the invention, the manipulator rollers are located above the disintegrator roller and each wing is adapted to rotate about an axis positioned generally at the same level as the manipulator rollers.

In accordance with a further aspect of the invention, each wing comprises a back panel having one edge fixed to an axle for rotating the wing. The wing may include an arcuate back panel with a side panel fixed to each end of the back panel. Alternately, the back panel may be constructed from a number of segments fixed in an arcuate shape with a side panel fixed to each end of the segmented back panel. In addition, the wings may further include manipulator rollers mounted so as to be substantially parallel to the manipulator rollers in the housing.

In accordance with another aspect of this invention, the processor includes a mechanism fixed to the axle of each of the wings to lift and lower the wings. The mechanism may include levers fixed and driven by a linear motor such as a hydraulic cylinder or a reversible linear electrical motor.

In accordance with a further aspect of this invention a discharge door is mounted above the discharge opening and adapted to be pivotably raised and lowered for deflecting the crop material discharged from the discharge opening at an angle dependent on the positioning of the discharge door. In addition, the discharge door is coupled to the wing rotation mechanism for preventing the discharge door from being raised when the wings are in a lowered position.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

Figure 1:
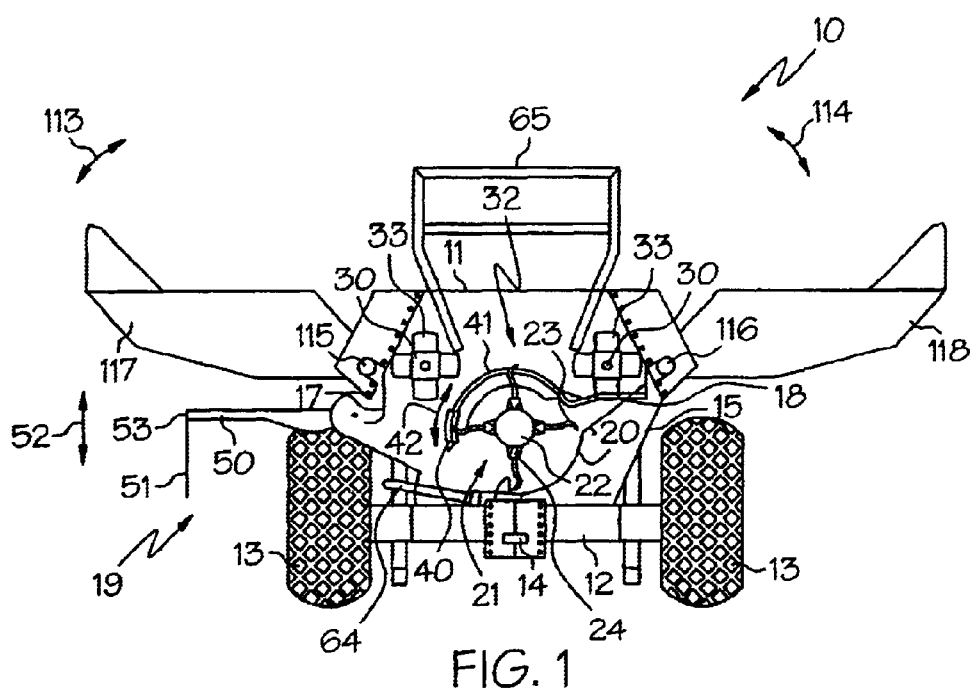
FIG. 1 illustrates a front view of a bale processor in accordance with the present invention with the wings lowered.

The baled crop material processor 10 illustrated in FIG. 1 has a number of components that are similar to a typical bale processor of the type described in the above noted patents and patent applications. Processor 10 includes a housing 11, which is fixed to a rectangular chassis 12 on which support wheels 13 are mounted. Chassis 12 further includes a hitch 14 for connection to another machine such as a tractor for pulling the processor 10 and for providing power to the processor 10 through a power take-off shaft and/or tractor hydraulics. Tractor power-take offs conventionally rotate in a clockwise direction when observed looking forward from the back of the tractor.

The housing 11 is constructed to contain and accommodate the various components of the processor 10 for supporting, manipulating, disintegrating and discharging the baled material. Housing 11 comprises a front wall 15, a back wall 16, a first side wall 17 and second side wall 18, where side wall 17 is a partial side wall forming a discharge opening 19 below wall 17 and where side wall 18 extends as shown at 20 to form the bottom of the housing 11.

Within the housing 11 are mounted a disintegrator 21 substantially along the length and at the centre of the housing 11. The disintegrator 21 includes a flail roller 22 which connects through front wall 15 to the power take-off shaft. The roller 22 rotates about its longitudinal axis. The disintegrator 21 also includes a plurality of flails 23 intermittently spaced circumferentially and longitudinally about the roller 22. The flails 23 extend radially from the flail roller 22 and are connected to the roller 22 by pivots 24. Since the tractor power take-off conventionally rotates in a clockwise direction, the processor illustrated in FIGS. 1 and 2 which is a right side discharge processor, will also include a rotation converter 25 mounted on the outside of the front wall 15. The converter may be of the type described in Canadian Patent Application Serial No. 2,295,417 filed on Jan. 14, 2000 which corresponds with U.S. patent application Ser. No. 09/749,202 filed on Dec. 27, 2000 and which is incorporated herein by reference.

The bale processor 10 further includes a number of mechanisms for manipulating the bale and directing it to the disintegrator 21 such that the bale remains generally intact for disintegration primarily by the disintegrator 21. The mechanisms include at least a pair of manipulator rollers 30, each roller 30 mounted parallel to and between the disintegrator 21 and a side wall 17 or 18 respectively. Each manipulator roller 30 is also mounted on bearings between the end walls 15 and 16 at a location higher than the disintegrator 21 and near the side wall 17 and 18. The manipulator rollers 30 which support and manipulate a bale are coupled to hydraulic motors that may be mounted on the outside of the housing 11 either on wall 15 or 16. The manipulator rollers 30 may be rotated in either direction as desired by the operator. Rollers 30 further include paddles 33 spaced circumferentially and longitudinally along the rollers 30. The paddles 33 project outwardly from the rollers 30 to grip and rotate the bale. The spacing between the two manipulator rollers 30 defines a disintegration opening 32 where the bale encounters the disintegrator 21.

The housing 11 further contains an elongated charging plate 40 which is positioned adjacent the disintegrator 21. The charging plate 40 may have a planar surface or a curvilinear surface in the form of a baffle as illustrated in FIG. 1, and is adjacent the disintegrator 21 a short distance from the ends of the rotating flails 23 to generate air flow by the rotating flails 23. Further, hoops 41 may be positioned perpendicular to the flail roller 22, interspaced between the flails 23 along the length of the flail roller 22 to help support the bales above the disintegrator 21. Hoops 42 may be fixed at one end through the side wall 18 and at the other end to the charging plate 40. The charging plate 40 itself may be fixed at each end to the end walls 15 and 16. Alternately, charging plate 40 may be moveably fixed to the end walls 15 and 16 such that the charging plate 40 may be adjusted vertically in order to raise and lower the hoops 41 as shown by arrows 42. This allows the operator to vary the height of the supported bale over the disintegrator 21 so that the length of the disintegrated bale material being discharged from the processor 10 will be appropriate for particular uses.

As further illustrated in FIG. 1, a discharge door 50 is mounted between end wall 15 and 16 in a hinged manner just at the bottom of the side wall 17 and above the discharge opening 19 such that the outer edge 53 of the discharge door may be raised or lowered as shown by arrow 52 to guide the shredded bale material as it is discharged. The discharge door 50 may include a flap 51 mounted on the distal edge 53 of the discharge door 50. Preferably, the flap 51 is made of a flexible durable material such as rubber and will help to direct the disintegrated crop material downward.

In addition to the discharge door 50, a deflector 64 may be mounted at the bottom of the discharge opening 19. Deflector 64 is an elongated plate which runs the full length of the housing 11. The inner edge of deflector 64 is pivotally mounted at the end of the bottom wall 20 such that the outer edge of the deflector 64 may be raised or lowered to partially deflect the crop material being discharged from the processor 10.

When the outer edge 53 of the discharge door 50 is in an upper position, the discharged material will be spread over a wide area; when the outer edge 53 of the discharge door 50 is in a lower position, the discharged material will form a windrow as the processor 10 moves; and when the outer edge 53 of the discharge door 50 is in an intermediate position, the discharged material can be directed into a feed bunk. Deflector 64 can be operated in unison with the discharge door 50 in order to effect the discharge the most appropriate for the circumstance.

Figure 2:
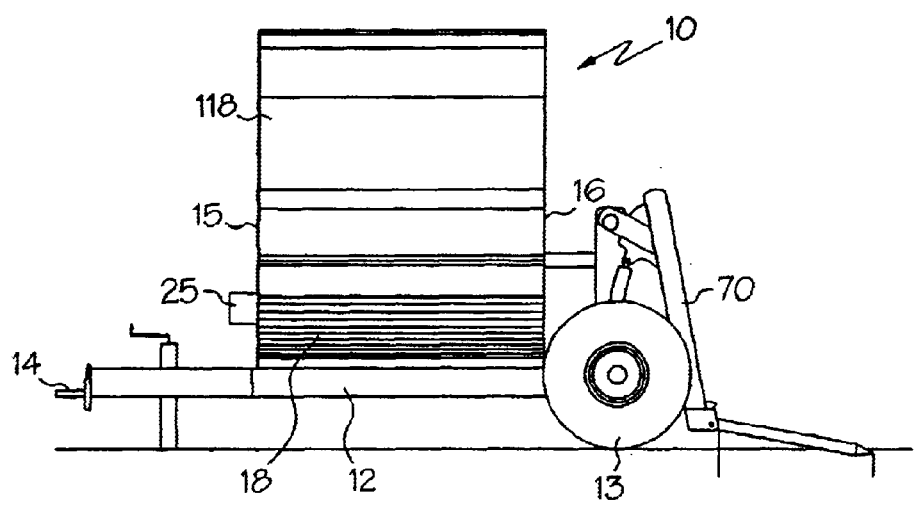
FIG. 2 illustrates a side view of the bale processor.

An open guard railing 65 may also be fixed to the to the front wall 15 to prevent a bale from falling off of the front of the processor 10 as it is being loaded from the rear. Also as illustrated in FIG. 2, a fork lift 70 may be fixed to the chassis 12 at the rear of the processor 10 such that an operator can self load a bale into the processor 10 by backing the processor 10 to the bale. Using the fork lift 70, the operator may also pick up and carry a second bale to the area where the bales are to be disintegrated.

Further, as described with respect to the above noted patents and patent applications, fixed sidewalls 17 and 18 of the housing 11 would generally extend upward with an outward slope well above the manipulator rollers 30. The extended fixed walls 17, 18 together with the rollers 30 and the hoops 41 support the bale within the processor 10 as the rollers 30 rotate the bale. While the bale rotates, the rotating flails 23 on the flail roller 22 grasp some of the crop material on the bale, effectively disintegrating the bale. The bottom section 20 of wall 18 extends below the disintegrator 21 to guide the disintegrated bale for discharge through the discharge opening 19. On the other hand, wall 17 extends downward just past the roller 30. Wall 17 is not extended further towards the flail roller 22 in order not to restrict the disintegrator chamber or the discharge opening 19. The bottom edge of wall 17 defines the top of the discharge opening 19 which is further defined by bottom section 20 of wall 18 and the end walls 15 and 16 through which the flails 23 on the flail roller 22 drive the shredded crop material to discharge it from the processor 10. Thus any material that falls between roller 30 and wall 17 drops into the discharging material and out of the processor 10 precluding clogging at roller 30.

Figure 3:
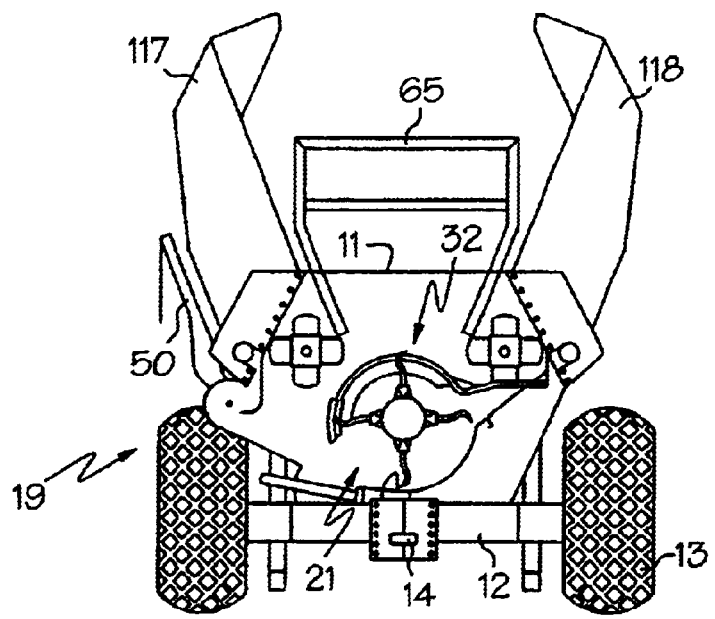
FIG. 3 illustrates a front view of the bale processor with the wings raised.

In accordance with the present invention, as illustrated in FIGS. 1 and 3, the fixed section of walls 17 and 18 of the processor 10 are terminated at a level that is no higher than the top of the paddles 33 on the manipulator rollers 30. Further movable wall sections in the form of wings 117, 118 are pivotally mounted about axes 115, 116 on either side of the processor 10 just above the end of the fixed wall sections 17 and 18 to extend these walls. The wings 117, 118 may be lowered to an open position as illustrated in FIG. 1, or lifted to a closed position as illustrated in FIG. 3. The wings 117, 118 may also be stopped anywhere in between these extreme positions. The direction of rotation of each of the wings 117, 118 is illustrated by arrows 113, 114.

In the open position as shown in FIG. 1 or in a partially closed position, wings 117, 118 assist in supporting a bale of any conventional size whether round or square. The wings 117, 118 may be lifted to a closed position which minimizes the width of the processor 10. This is particularly useful when the processor 10 is not in use or when it is being transported from one location to another through narrow passages or on public roads. The wings 117, 118 may be lifted and lowered using motors such as hydraulic cylinders or linear electrical motors.

In the embodiment illustrated in FIGS. 1, 2 and 3, the processor 10 is a right side discharge machine. However, left side discharge machines are also within the scope of the present invention. The interior mechanisms and the housing of left and right side discharge machines are substantially mirror images of one another.

Figure 4:
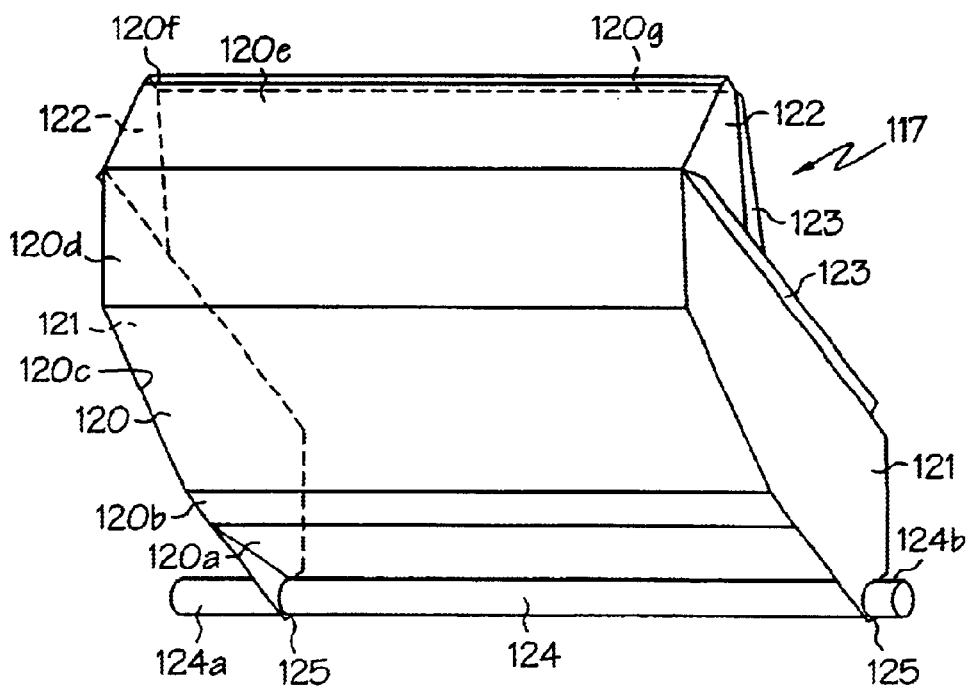
FIG. 4 illustrates details of a wing.

The preferred embodiment of the wings 117, 118 is illustrated in FIG. 4, though only wing 117 is shown. The wing 117 includes a back panel 120 which may be flat, formed or made from a number of segments 120a–120g welded together resulting in an arcuate shape. Side panels 121, 122 with flanges 123 may be welded to the back panel 120 to provide strength and rigidity. In addition an axle 124 is welded in openings 125 in side panels 121; axle 124 is also welded along its length to segment 120a. Axle 124 extends past the side panels 121 on each side of the wing 117 for mounting in the processor 10, which will be described with respect to FIG. 5. One axle extension 124a is longer then the other extension 124b in order to accommodate the mechanism for lifting and lowering the wings 117, 118 as will be described with respect to FIGS. 7 and 8. Both wings 117, 118 are mirror images of one another when they are facing each other such that the longer axle extensions 124a are on the same side of the wings 117, 118 as they face one another.

Figure 5:
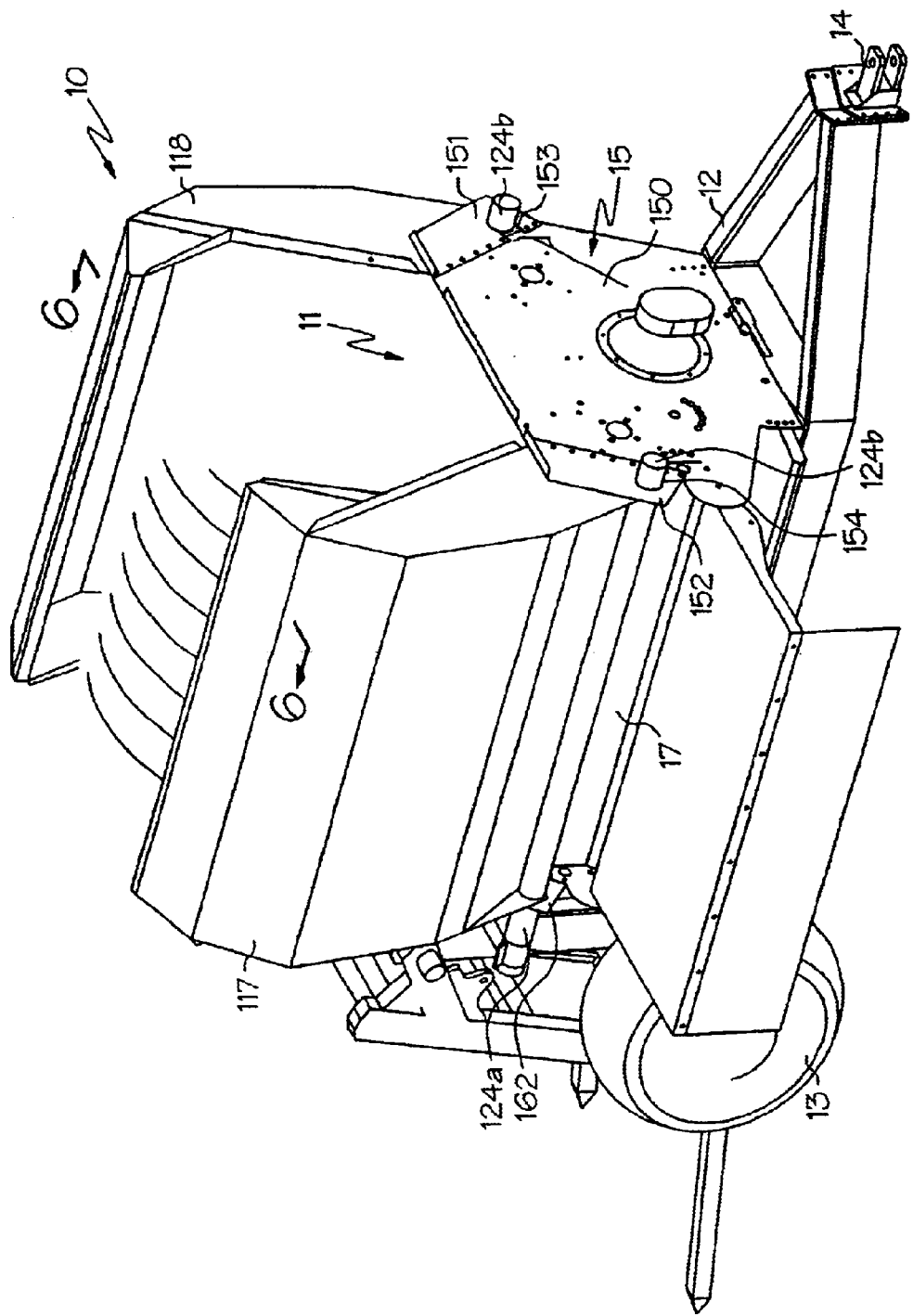
FIG. 5 illustrates the mounting of the wings in the processor.
Figure 6:
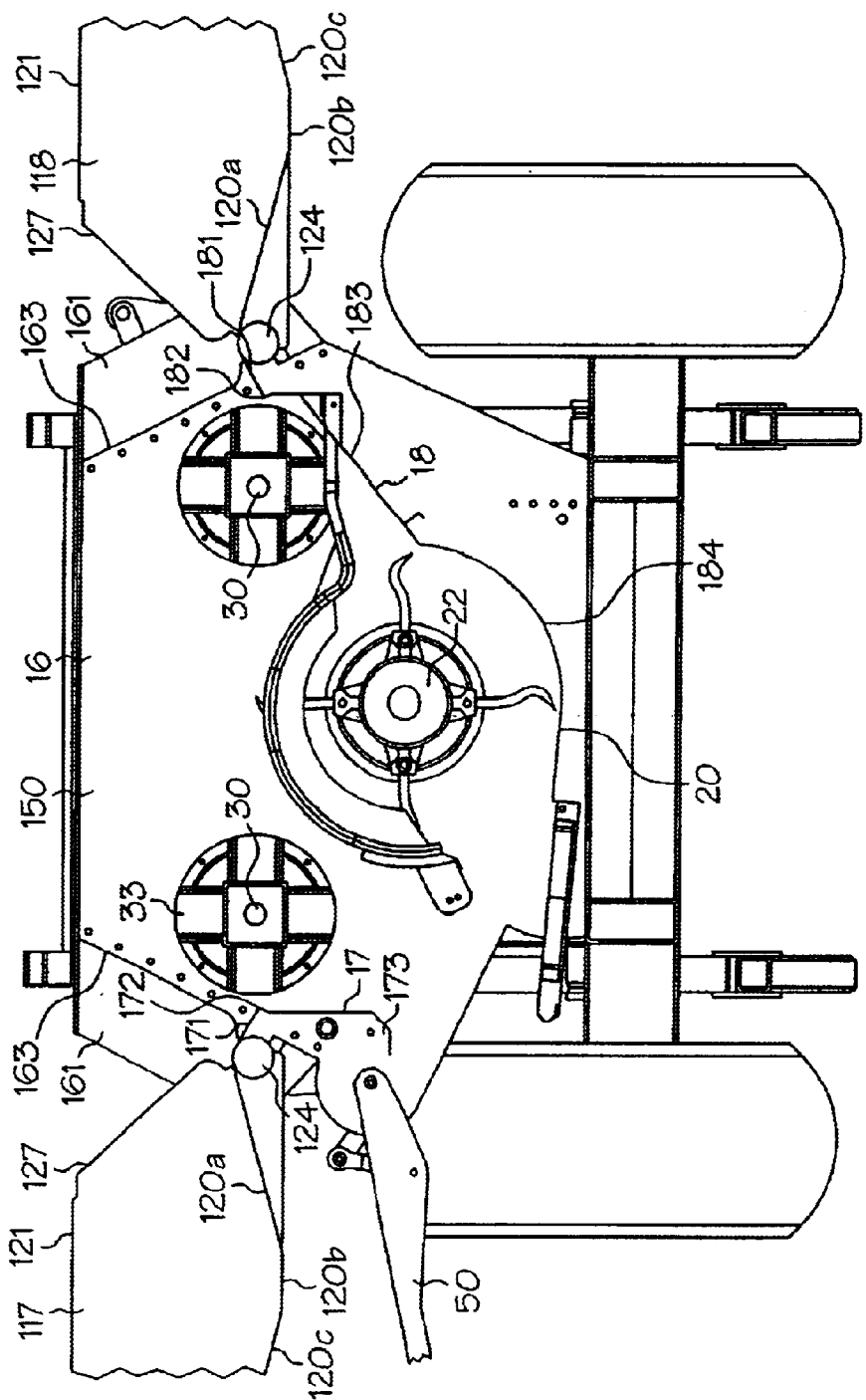
FIG. 6 illustrates the profile of the fixed side walls and the mounting of the wings.

FIG. 5 illustrates the wings 117, 118 mounted within the processor 10. The processor 10 includes a front end wall 15 and a similar back end wall 16 (not shown). End walls 15, 16 include a main panel 150, 160 which is fixed to the chassis 12 and to the fixed side walls 17, 18 (not shown). End wall 16 and side wall 18 are shown in FIG. 6 which is a cross-section of the processor 10 taken along the plane illustrated in FIG. 5. In additions end wall 15 includes two extension panels 151, 152 which are fixed to the main panel 150 at each side and over the main panel 150. Opening 153, 154 in the extension panels 151, 152 receive the axle extensions 124b of the wings 117, 118. A similar back wall 16 includes the main panel 160 and the extension panels 163, 164 which receive the longer axle extensions 124a. This arrangement is particularly advantageous since the wings 117, 118 are mounted to pivot freely between the front and the back walls 15, 16, about the axle 124. However, in the lifted or closed position as shown in FIG. 5, the edge of the side panels 121 butt up against the edge of the main panels 150, 160. For example, as shown in FIG. 6, edges 127 of panels 121 mate with edges 163 of the main panel 150.

FIG. 6 further illustrates the profile of the fixed side walls 17 and 18. As described above with regard to FIG. 1, side wall 17 is a partial wall fixed at both ends to the end walls 15 and 16. Wall 17 begins 171 at the axle 124 of wing 117 and forms a protrusion 172 at the level of the roller 130 which has a clearance in the order of ½ to 1 inch from the paddles 33. Wall 17 then drops down and ends just below the discharge door 50. Side wall 18 similarly begins 181 at the axle 124 of wing 118 and forms a protrusion 182 at the level of the roller 130 which has a clearance in the order of ½ to 1 inch from the paddles 33. However, side wall 18 then has a section 183 which slopes downward towards the flail roller 22 and then includes an arcuate section 184 that forms the bottom of the housing 11. Side wall 18 is also fixed between the front and the back walls 15 and 16.

Figure 7:
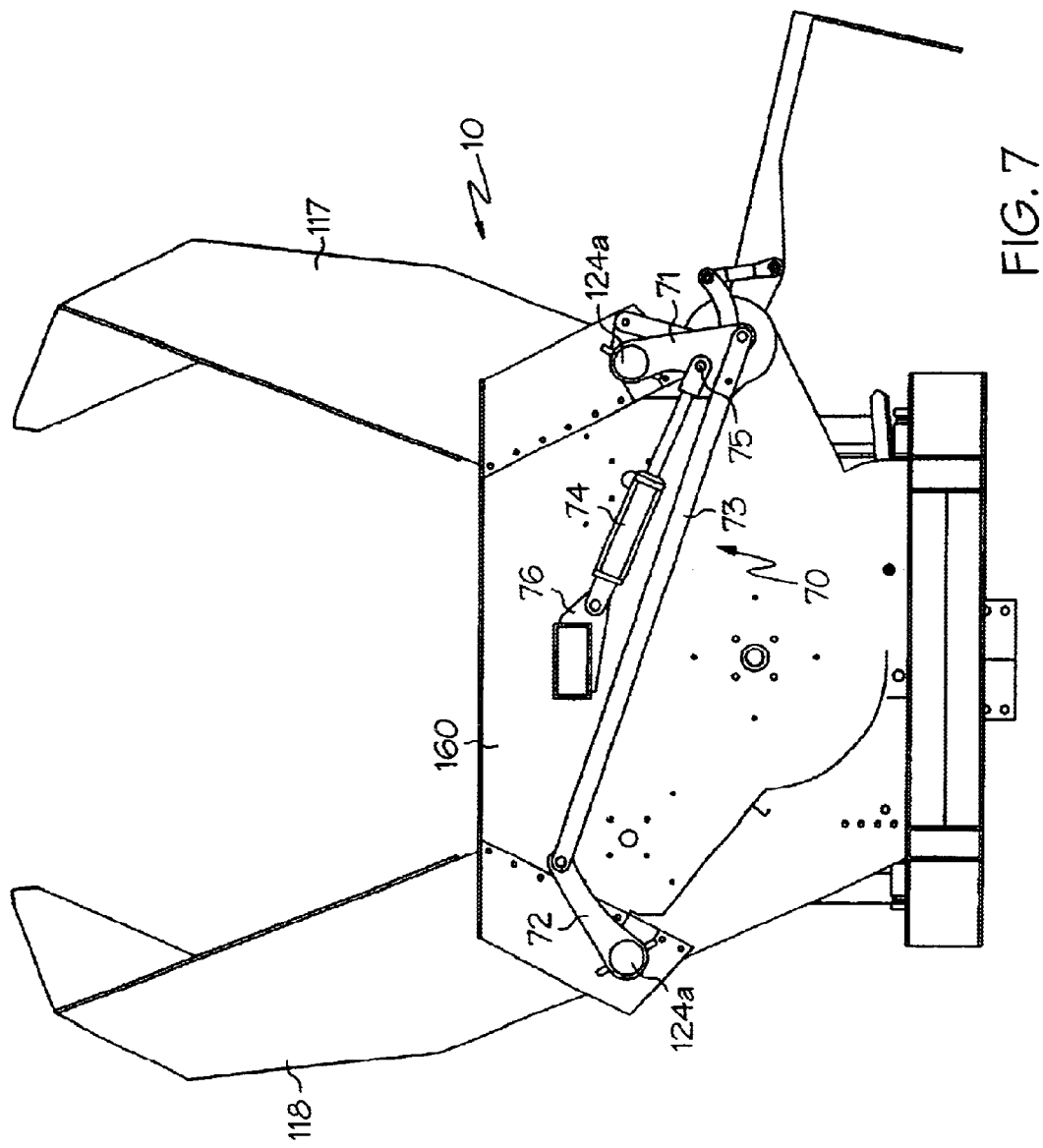
FIG. 7 illustrates the control mechanism for controlling the movement of the wings with the wings lifted.
Figure 8:
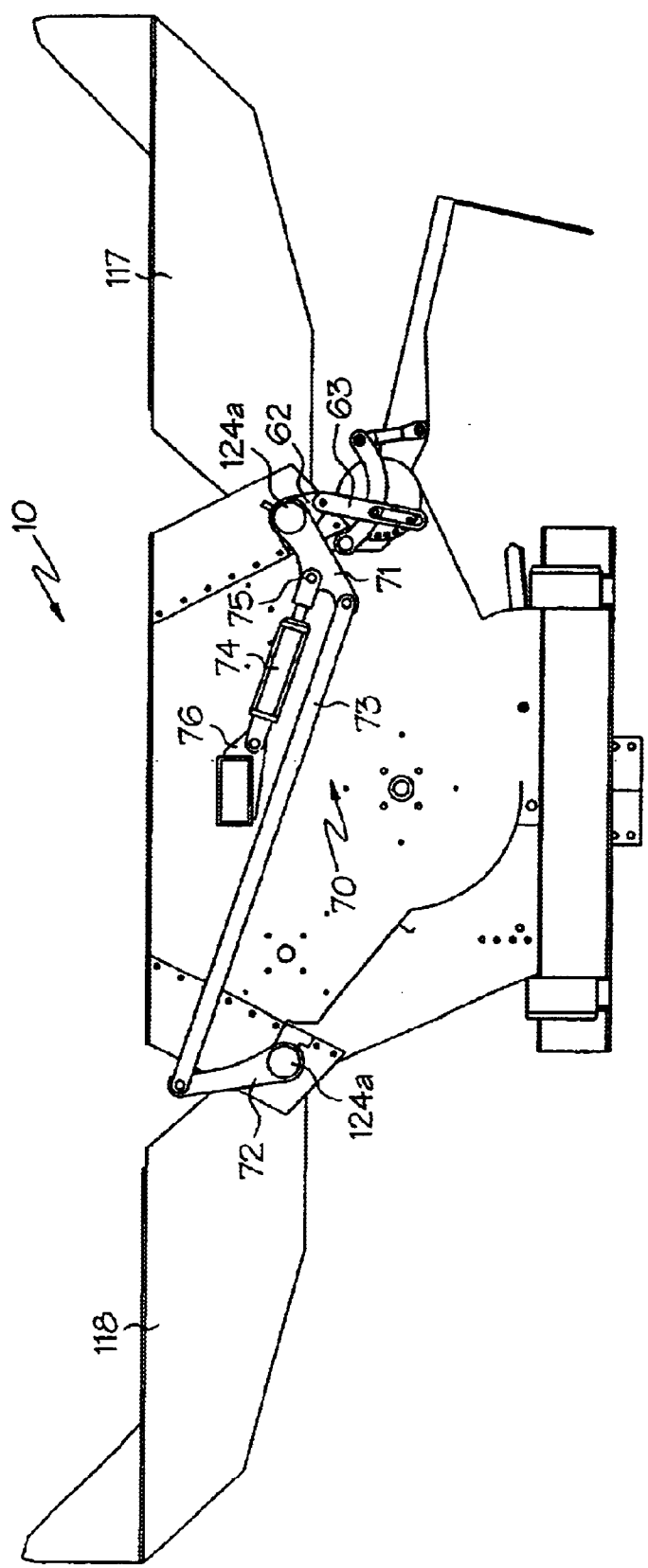
FIG. 8 illustrates the control mechanism for controlling the movement of the wings when with the wings lowered.

FIGS. 7 and 8 illustrate the mechanism 70 for controlling the lifting and lowering of the wings 117, 118 as seen from the back of the processor 10. The mechanism 70 includes a first lever 71 fixed to the axle extension 124a of wing 117 and a second lever 72 fixed to the axle extension 124a of wing 118. A linkage 73 is pivotally connected between the ends of lever 71 and lever 72. A hydraulic cylinder is connected between a pivot point 75 on lever 71 and a pivot point on a plate 76 that is fixed to the back wall 16. When the hydraulic cylinder 74 is operated to be extended as shown in FIG. 7, the wings 117, 118 are lifted to the closed position. Alternately, as the hydraulic cylinder 74 is withdrawn, the wings 117, 118 are lowered to open to any desired position including the horizontal position illustrated in FIG. 8. Though a hydraulic cylinder 74, which may be connected to the tractor hydraulics and controlled by the tractor operator, is preferred to drive the levers 71 and 72 to lift and lower the wings 117, 118, a reversible linear electrical motor may also be used for this purpose.

Figure 9:
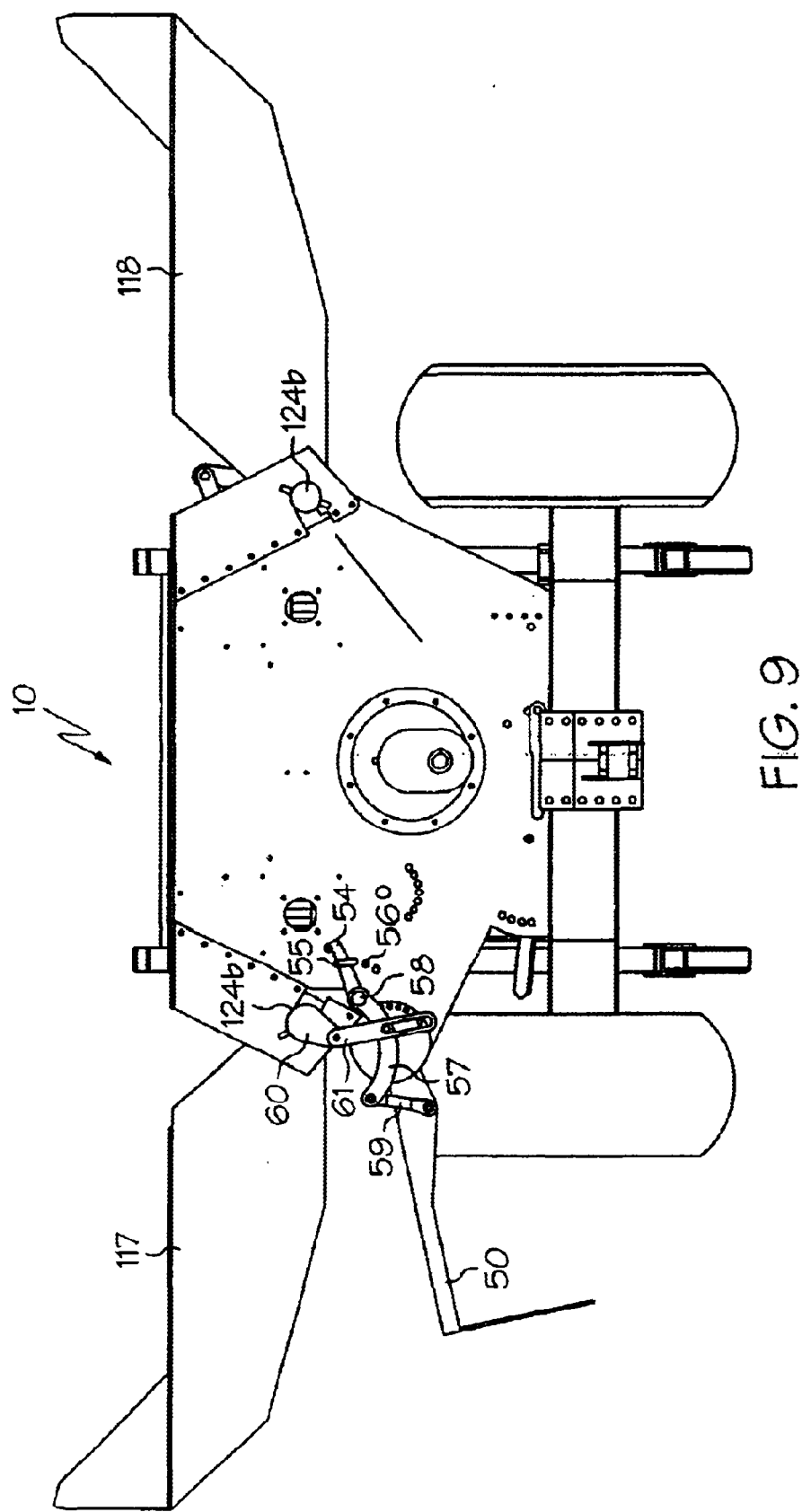
FIGS. 9 to 11 illustrate the interconnection of the control mechanism for the discharge door with the position of the wings.
Figure 10:
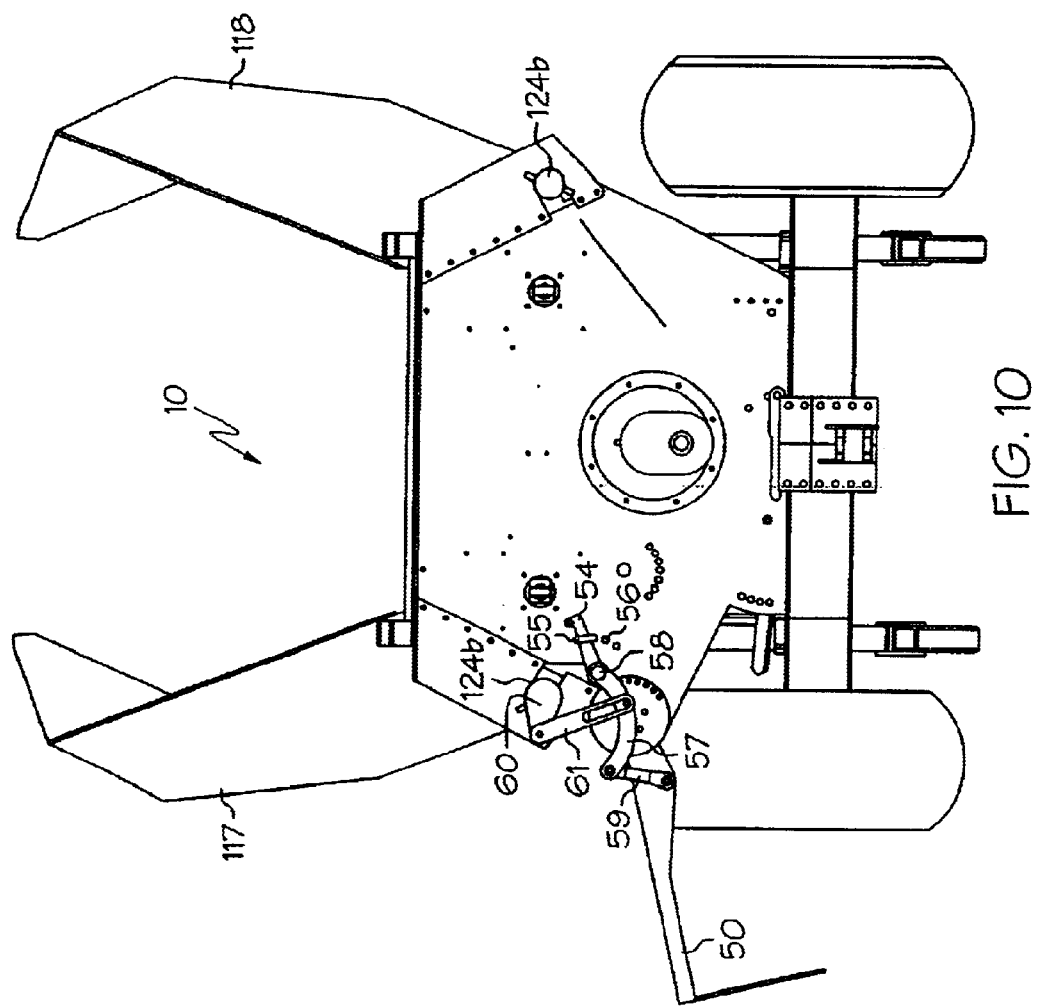
Figure 11:
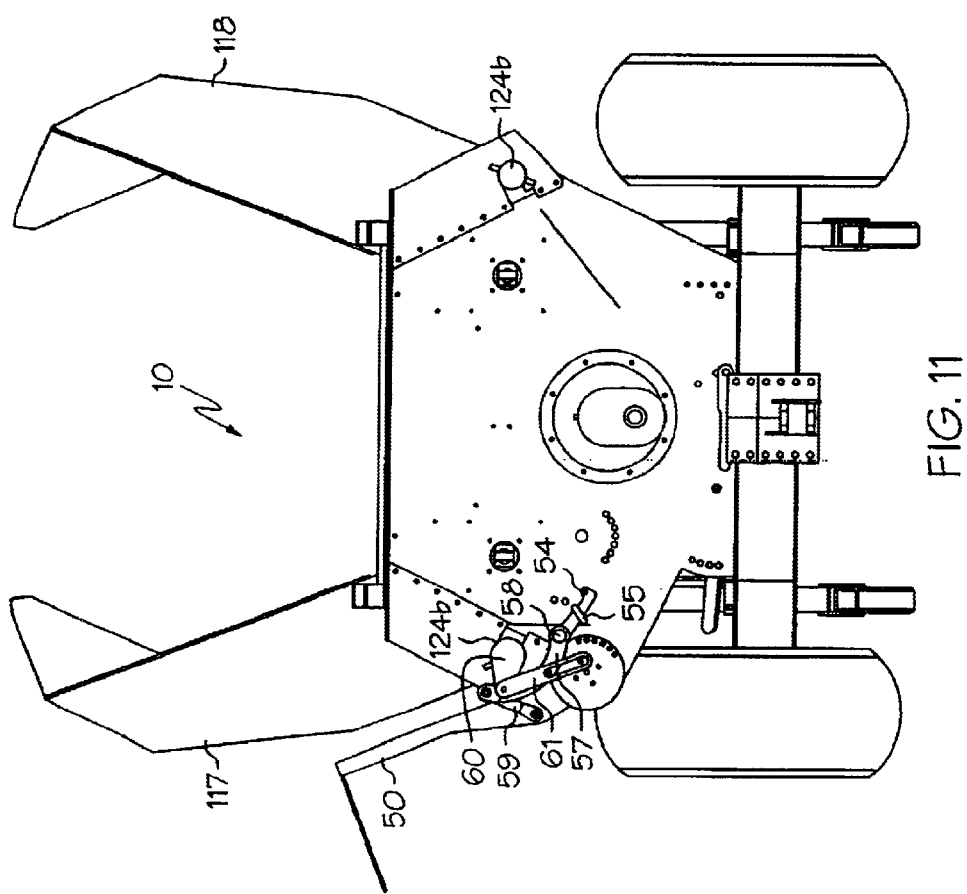

As illustrated in FIGS. 9 to 11, the position of discharge door 50 is controlled by a lever 54 which includes a handle 55 for latching the door 50 into a number of fixed positions 56. Lever 54 is fixed to a linkage 57 which at one end is fixed a rotatable shaft 58 and at the other end is fixed to a discharge door 50 linkage 59. Lever 54 may be connected to a hydraulic cylinder or some other motor, or the door may be manually manipulated. In addition, a lever 60 may be fixed to the axle extension 124b to which is pivotally connected a sliding block linkage 61. The sliding block linkage 61 is coupled to the linkage 57 so as to slide freely when the door 50 is in a lowered position and as the wings 117, 118 are lifted and lowered. However, as shown in FIG. 9, the discharge door 50 is prevented from pivoting into a vertical position by the sliding block linkage 61 when the wing 117 is in the lowered position. Once wing 117 is lifted to the closed position, linkage 61 permits lever 54 to be rotated to raise the discharge door 50 to a vertical position. It can be further seen on FIG. 8 that a similarly controlling lever 62 and sliding block linkage 63 may also be installed at the back end of the processor 10 connected between the axle extension 124a and the discharge door 50 linkage.

Figure 12:
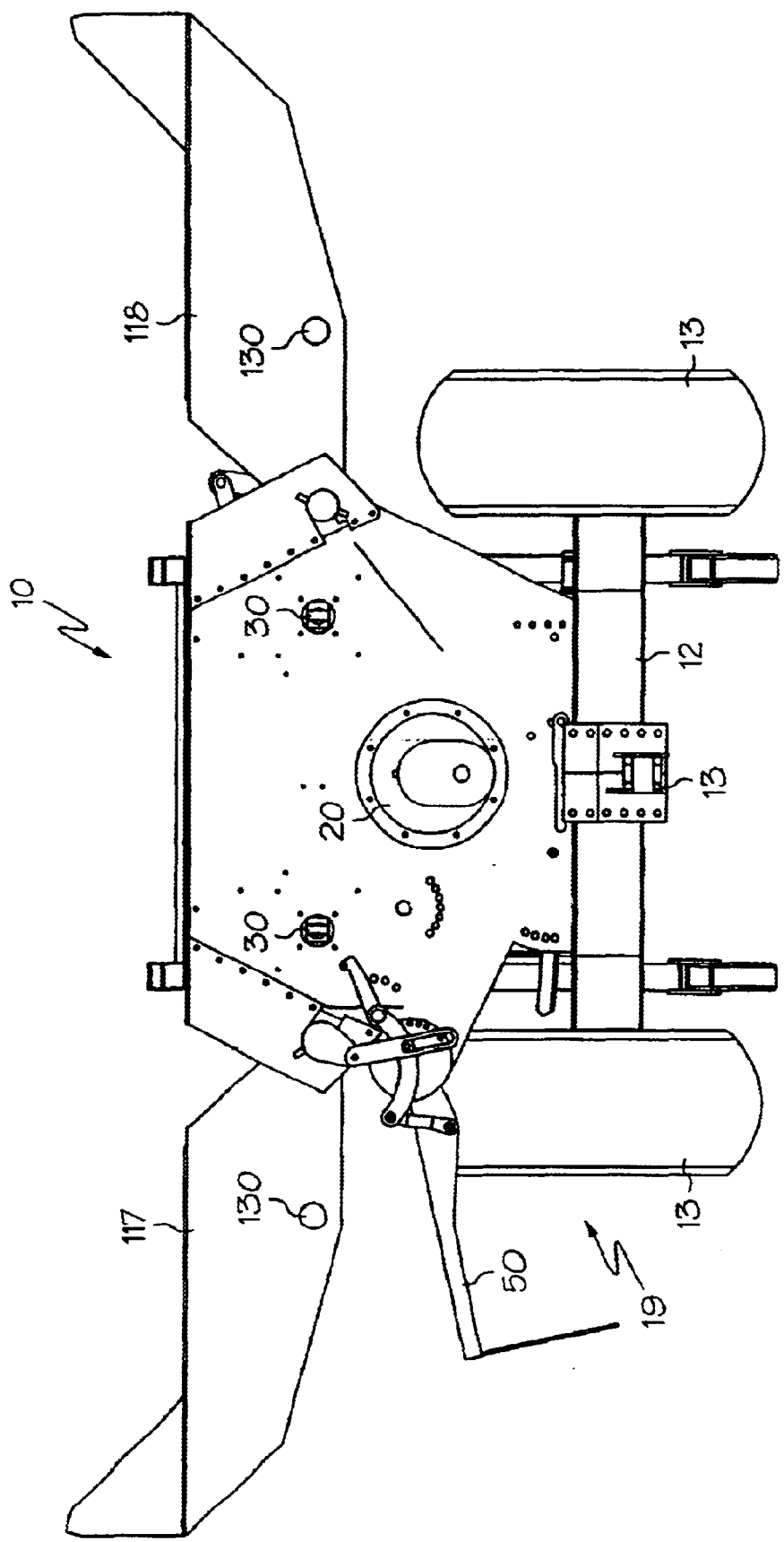
FIG. 12 illustrates a processor in accordance with the present invention with manipulator rollers in the wings.

In another embodiment of the present invention, as illustrated in FIG. 12, the processor 10 may further include a further manipulator roller 130 mounted in each of the wings 117, 118 along the length of the processor 10 parallel to the manipulator rollers 30. Manipulator rollers 130, which maybe identical to rollers 30 assist in moving a bale to the disintegrator 21 in the processor 10, especially when they are large rectangular bales. The manipulator rollers 130 may be hydraulically, belt or chain driven.

FIGS. 3, 7 and 11 show the bale processor 10 in accordance with the present invention in its transportation mode with the wings 117 and 118 in their lifted position and the discharge door 50 in the vertical position. In this position, the processor 10 has an overall width of approximately 8 feet, allowing the processor 10 to be pulled or transported along roadways and through narrow gates or passages. With fork lift 70 shown in FIG. 2, the processor 10 can transport two round bales, one in the processor 10 itself and one on the fork-lift 70. The processor 10 may not be able to store a large square bale within itself if it is necessary to close the wings 117, 118 for transfer from one location to another.

When it is desired to process a bale, the discharge door is lowered to a desired position and the deflector 64 is also positioned. If a round bale is already in the processor 10 as shown in FIG. 5, the operator may start the disintegrator 21 and the manipulator rollers 30 to process the bale. If it is desired to load a bale, such as a large square bale, into the processor 10, the operator activates the control mechanism 70 as shown in FIGS. 7 and 8 once the discharge door is in the lowered position. With the wings 117, 118 opened, a bale may be loaded into the processor 10. Round bales are usually loaded with their axis parallel to the axis of the disintegrator 21. The long square cross-section bales are usually loaded so that the length of the bale is across the processor 10. The manipulator rollers 30 are then used to move the bale back and forth across the processor 10 while the disintegrator 21 processes the bale.

It may be desirable to use the processor 10 described with respect to FIG. 12 for long square bale is particularly large or heavy. The manipulator rollers 130 in the wings 117, 118 provide added control for the manipulation of the bale.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A crop material processor for disintegrating baled crop material comprising:
   a housing for receiving and containing the baled crop material, the housing having a front wall, a back wall, a left side wall, a right side wall and a bottom, wherein each of the left and right side walls includes a fixed lower section and a pivotably mounted upper section forming a movable wing;
   a disintegrator having a roller positioned along the length of the housing mounted to rotate about its own longitudinal axis;
   manipulator rollers mounted inside the housing substantially parallel to the disintegrator; and
   a discharge opening at the bottom of one of the side walls to discharge material from the processor.

2. An apparatus as claimed in claim 1 wherein the manipulator rollers are positioned above the disintegrator roller and each wing is adapted to rotate about an axis located generally at the same level as the manipulator rollers.

3. An apparatus as claimed in claim 2 wherein each wing comprises a back panel having one edge fixed to an axle for rotating the wing.

4. An apparatus as claimed in claim 3 wherein the back panel is arcuate and further includes a side panel to fixed to each end of the back panel.

5. An apparatus as claimed in claim 3 wherein the back panel comprises a number of segments fixed in an arcuate shape and further includes a side panel fixed to each end of the segmented back panel.

6. An apparatus as claimed in claim 3 comprising a mechanism fixed to the axle of each of the wings to lift and lower the wings.

7. An apparatus as claimed in claim 6 wherein the mechanism comprises levels fixed to a linear motor.

8. An apparatus as claimed in claim 7 wherein the linear motor is a hydraulic cylinder or a reversible linear electrical motor.

9. An apparatus as claimed in claim 6 comprising a discharge door mounted above the discharge opening and adapted to be pivotably raised and lowered for deflecting the crop material discharged from the discharge opening at an angle dependent on the positioning of the discharge door.

10. An apparatus as claimed in claim 9 wherein the discharge door is coupled to the wing rotation mechanism for preventing the discharge door from being raised when the wings are in a lowered position.

11. An apparatus as claimed in claim 2 comprising further manipulator rollers mounted within the wings.

12. An apparatus as claimed in claim 2 wherein the processor further comprises a charging plate mounted adjacent and parallel to the disintegrator roller between the disintegrator and the and the discharge opening.

13. An apparatus as claimed in claim 12 wherein each of the fixed side walls sections have a protrusion projecting into the housing substantially level with and parallel to the manipulator roller.

* * * * *